(12) United States Patent
Van Steen et al.

(10) Patent No.: US 8,218,547 B2
(45) Date of Patent: Jul. 10, 2012

(54) NETWORKED CONTROL SYSTEM USING LOGICAL ADDRESSES

(75) Inventors: Martinus Richardus Van Steen, Leiden (NL); Robert Van Herk, Dordrecht (NL); Mark Henricus Verberkt, Eindhoven (NL); Bozena Erdmann, Aachen (DE); Oliver Schreyer, Herzogenrath (DE); Armand Michel Marie Lelkens, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 239 days.

(21) Appl. No.: 12/532,416

(22) PCT Filed: Mar. 14, 2008

(86) PCT No.: PCT/IB2008/050960
§ 371 (c)(1),
(2), (4) Date: Sep. 22, 2009

(87) PCT Pub. No.: WO2008/120120
PCT Pub. Date: Oct. 9, 2008

(65) Prior Publication Data
US 2010/0034119 A1 Feb. 11, 2010

(30) Foreign Application Priority Data
Mar. 29, 2007 (EP) .................................. 07105218

(51) Int. Cl.
*H04L 12/28* (2006.01)
(52) U.S. Cl. .................... 370/392; 370/352; 370/401

(58) Field of Classification Search .................. None
See application file for complete search history.

(56) References Cited

U.S. PATENT DOCUMENTS

| | | | | |
|---|---|---|---|---|
| 6,779,051 | B1 * | 8/2004 | Basil et al. | 710/33 |
| 6,792,323 | B2 * | 9/2004 | Krzyzanowski et al. | 700/90 |
| 7,565,351 | B1 * | 7/2009 | Callaghan | 1/1 |
| 2004/0255038 | A1 | 12/2004 | Kuroda et al. | |
| 2005/0232301 | A1 * | 10/2005 | Lee et al. | 370/464 |
| 2006/0023643 | A1 | 2/2006 | Lim | |
| 2006/0251086 | A1 * | 11/2006 | Ha et al. | 370/401 |
| 2011/0068900 | A1 * | 3/2011 | Billig et al. | 340/9.1 |

FOREIGN PATENT DOCUMENTS

| | | |
|---|---|---|
| EP | 1734706 A1 | 12/2006 |
| WO | 2006083416 A2 | 8/2006 |

(Continued)

OTHER PUBLICATIONS

Cheshire et al: "Dynamic Configuration of IPv4 Link-Local Addresses"; Network Working Group, Request for Comments: (RCF) 3927, May 2005, 33 Page Document.

(Continued)

*Primary Examiner* — Duc C Ho
(74) *Attorney, Agent, or Firm* — Mark L. Beloborodov (57) ABSTRACT

Networked control systems and methods include a plurality of devices connected to a network. At least one device has a logical address that includes a device type and a device location in an environment of the device in a user readable and understandable format, such as English or other languages. The system further includes a processor connectable to the network and configured to execute control logic using the logical addresses. A memory is provided for storing a mapping from the logical address to a physical network address of the device.

2 Claims, 2 Drawing Sheets

FOREIGN PATENT DOCUMENTS

| | | |
|---|---|---|
| WO | 2006091042 A1 | 8/2006 |
| WO | 2008099307 A1 | 8/2008 |

OTHER PUBLICATIONS

Alexander et al: "DHCP Options and Bootp Vendoor Extensions"; Network Working Group, Request for Comments: (RCF) 2132, Mar. 1997, 34 Page Document.

Mascolo et al: "D5.1:Survey of Middleware for Networked Embedded Systems"; Sixth Framework Programme Priority 2 "Information Society Technologies", Reconfigurable Ubiquitous Networked Embedded Systems (RUNES), 83 Page Document.

Wong, W.: "Build a Self-Organizing Control Network: Acting As a Sensor-To-Network Bridge, The PyxOS Eyes Robust Control Device Interconnects"; Electronic Design, Oct. 27, 2005, 3 Page Document.

Michta, E.: "Development Trends of Measurement and Control Systems"; Downloaded From http:/www.ime.iz.zgora.pl/konf/sp06/referaty-pak/1_Michta.pdf, 3 Page Document.

* cited by examiner

NETWORKED CONTROL SYSTEM USING LOGICAL ADDRESSES

FIELD OF THE INVENTION

The present invention relates to use of logical addresses for networked control systems with communication independent control logic.

BACKGROUND OF THE INVENTION

Networking of devices is a ubiquitous trend in business (commercial, industrial, institutional) and also consumer markets. Examples where networked devices are used include building automation systems, e.g. for lighting, heating/ventilation/cooling, and safety, where various devices like light ballasts, switches, daylight/occupancy sensors, actuators, meters etc., are inter-connected such as wirelessly via RF modules, for example. The large number of devices in a control network, together with their small footprint and potentially very complicated application logic to be run on them, require new approaches to control network management.

To reduce complexity of creating or configuring networks and node addressing, various systems and methods are known for network addressing, where addresses of nodes in a network are assigned and dynamically reassigned, such as based on the position and/or number of nodes in a tree or sub-tree of the node. For example, U.S. Patent Application Publication No. 2006/0023643 to Lim, which is incorporated herein by reference in its entirety, describes a method of adaptively reassigning address of nodes according to changes in volume in a wireless network, where the network address of the node is calculated from the position of that node in the routing tree.

Another network system management method is disclosed in International Publication Number WO 2006/091042 to Jeon et al. (Jeon), which is incorporated herein by reference in its entirety. This method makes sure that only one unique device in the network fulfills a certain role. For instance, if two refrigerators connect to the network, the Jeon method ensures that only one device will fulfill the role of refrigerator in the network, such that it will be uniquely known which device is the refrigerator. That is, the first refrigerator that is connected to the network will be given that address; further connected refrigerators are either ignored or replace the currently connected refrigerator. In the Jeon system, only the role of a device is taken into account; the location and other user-relevant information are not taken into account, where for example, two refrigerators cannot be properly addressed and connected to the Jeon network. Other network management systems group related nodes and assign them a unique group address, or automatically assign network addresses to devices upon joining the network, where such device network addresses are also referred to as physical device addresses.

However, use of physical device addresses as is currently done in conventional network systems, such as control systems (e.g. using the ZigBee™ protocol), complicates the design and maintenance of the systems. For example, if control logic is defined using physical device addresses, then the network design, e.g. with respect to setup and maintenance procedures, becomes inflexible and more error-prone, particularly when the network is defined or setup by non-technical people.

One problem with conventional control systems is that all the physical device addresses must be known at or during the time when the control logic is being designed. This means that the logic designer needs to program directly on the physical installation of the network. Hence, the logic designer needs first to find out exactly the location in the network of physical nodes and associated physical addresses. In practice, this means that for each and every network instance, dedicated/additional logic design or programming needs to take place.

Another problem is that when a device is added once the network is up, a new or previously unknown physical address will have to be manually incorporated into the control logic. Thus, the logic designer again needs to partially reprogram the logic with a new physical address, for example.

A further problem is that of hot replacement of device in a system which often requires application and support logic re-installation on all devices hosting logic related to and/or wishing to communicate results to the replaced device. This is typically due to the use of physical device addresses (e.g., network addresses and/or hardware (HW) addresses of devices) for the logic design and application-related communication.

In addition, typically, the addresses assigned to devices or groups of devices are purely numerical, and are meaningless to users, and may even be unreadable by the user. For example, the assigned addresses in conventional systems and methods are machine addressing related to the device's position in the network tree as in ZigBee™. In TCP/IP networks, the machine addressing is related to the device's position in particular sub-network (e.g., if DHCP protocol is used, such as RFC2132 of IETF, as described in http://www.ietf.org/), or completely random (if IPv4 Link-Local addresses protocol is used, such as RFC3927 of IEFT as described in http://www.ietf.org/). Such user-unreadable or meaningless addressing often does not have anything to do with the device type and/or the actual device location in the environment. Rather, any location information used in conventional networks and addressing is related to the device node location in the network tree, and is not related to the actual device location in the environment.

Accordingly, there is a need for assigning logical addresses that include user-friendly identifiers.

BRIEF SUMMARY OF THE INVENTION

One object of the present systems and methods is to overcome the disadvantages of conventional network or control systems.

According to illustrative embodiments, networked control systems and methods comprise a plurality of devices connected to a network. At least one device has a logical address that includes a device type and a device location in an environment of the device in a user readable and understandable format, such as in English or other languages, e.g., "the switch in the hallway of the first floor." The system further includes a centralized and/or distributed processor connectable to the network and configured to execute control logic using the logical address(es). A memory, which may be centralized and/or distributed, is provided for storing a mapping from the logical address to a physical network address of the device.

Further areas of applicability of the present systems and methods will become apparent from the detailed description provided hereinafter. It should be understood that the detailed description and specific examples, while indicating exemplary embodiments of the systems and methods, are intended for purposes of illustration only and are not intended to limit the scope of the invention.

BRIEF DESCRIPTION OF THE DRAWINGS

These and other features, aspects, and advantages of the apparatus, systems and methods of the present invention will become better understood from the following description, appended claims, and accompanying drawing where:

DETAILED DESCRIPTION OF THE INVENTION

The following description of certain exemplary embodiments is merely exemplary in nature and is in no way intended to limit the invention, its applications, or uses. In the following detailed description of embodiments of the present systems and methods, reference is made to the accompanying drawings which form a part hereof, and in which are shown by way of illustration specific embodiments in which the described systems and methods may be practiced. These embodiments are described in sufficient detail to enable those skilled in the art to practice the presently disclosed systems and methods, and it is to be understood that other embodiments may be utilized and that structural and logical changes may be made without departing from the spirit and scope of the present system.

The following detailed description is therefore not to be taken in a limiting sense, and the scope of the present system is defined only by the appended claims. The leading digit(s) of the reference numbers in the figures herein typically correspond to the figure number, with the exception that identical components which appear in multiple figures are identified by the same reference numbers. Moreover, for the purpose of clarity, detailed descriptions of well-known devices, circuits, and methods are omitted so as not to obscure the description of the present system.

Systems and methods according to various embodiments use logical device addresses for designing, maintaining and running the device application logic within the system. The logical addresses are independent of the underlying transport technology and of the HW/network addresses of physical devices.

The logic designer programs the control logic using logical addresses for devices, instead of using purely numerical physical addresses. That is, the programmer is able or allowed to define logic on devices with logical addresses which are very loosely coupled to their physical addresses, or are independent of the underlying transport technology and/or network addresses of physical devices, for designing and maintaining the device application logic within a network, such as a control system.

The logical addresses are human readable and/or understandable, such as being English phrases or phrases in other languages. The logical addresses may be functional descriptions of devices including device type, owner and/or actual location in the physical or actual environment (as opposed to the device location in the network tree or a particular node's physical address), such as "the lamp in the hallway on the second floor". The system, e.g., a system processor, resolver and/or associated memory (where the resolver may be the part of the processor's functionality responsible for address resolution, for example), may be configured to process the human readable address in a physical installation at runtime, and maybe further configured to find which physical device is associated with a particular logical address.

For example, instead of referring to the position of the device in the routing tree, and the particular node's physical address, the actual location of a device is referred to, or included in the logical address, e.g., "in the hallway." Further, the type of the device is referred to, or included in the logical address, where the 'type' information of the logical address may include more than one device of the same type along with the actual locations of devices of the same (and/or different) type, such as "refrigerator in the kitchen" and "refrigerator in the basement." The device owner may also be included in the logical address, such as "grandma's switch."

Thus, instead of physical addresses that are purely numerical, user unreadable, or machine addressing related to the device's position in the network tree (where such physical addresses have nothing to do with the device types and real/actual locations of the devices in their physical environment such as a building), user-friendly identifiers are used as logical addresses to identify real or actual locations, device types and/or owners.

The human readable device descriptions or identifiers (i.e., the logical device address, e.g. "the switch in the hallway") are mapped to physical devices that implement the role of the device (e.g., a certain switch). The system establishes and maintains a mapping from the logical addresses (which may be at commissioning time, with human help such as manual input of the device type, owner and/or location or at runtime, using a protocol) to physical device addresses in a given physical network.

Once a change in the network is detected, for instance because a new device replaces an old (e.g., a broken) device, the mapping from logical addresses to physical addresses is updated. This approach greatly simplifies application logic installation, since it couples very loosely to the physical installation. The logic design process may thus be done independently of the physical installations and therefore is applicable to multiple physical network instances.

The present systems and methods simplify maintenance, since the logical address may be regarded as a pointer to the virtual device logic representation. At runtime, this pointer may be changed to point the logical address to a different physical device without having to reprogram the control logic.

Figure 1:
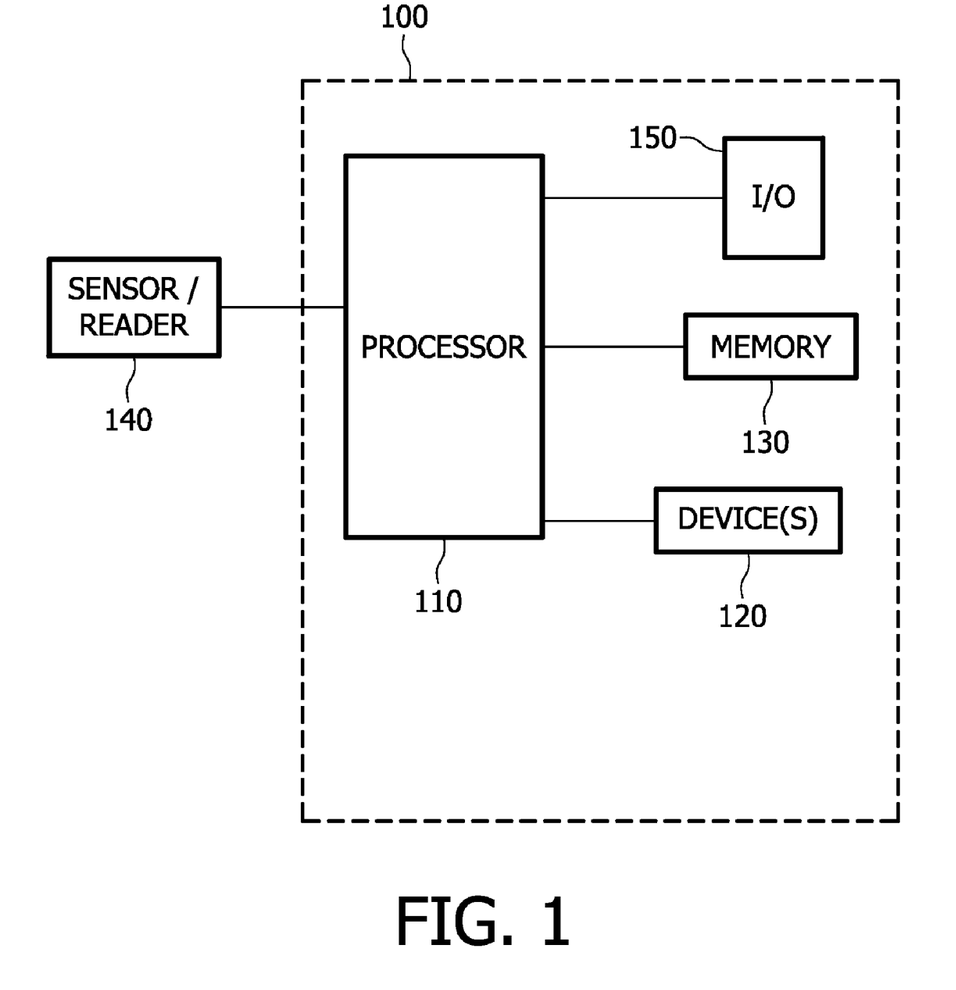
FIG. 1 shows a block diagram of an illustrative embodiment of the present networked control system.

FIG. 1 shows a block diagram 100 of one embodiment of a networked control system that includes a central resolver or processor 110 for managing a network of devices 120 operationally coupled to the processor 110. For clarity, a single device 120 is shown in FIG. 1, but it should be understood that many devices may be included in the network 100, where each device has a unique physical address and/or is connected to a unique or shared transceiver node whose address is associated with the device (or group of devices) connected thereto. Thus, the term "device" refers to a uniquely addressable functional device entity (e.g. lamp, switch), independent of connectivity implementation.

It should be understood that although a central memory 130 and central processor 110 are shown in FIG. 1 for simplicity and better clarity, so that the central processor 110 may act as a master device, e.g. for network control and configuration, with the device 120 directly connected to the central processor, the central processor 110 and memory 130 may be replaced with a distributed processor and memory. In one embodiment, each device may have its own processor and/or memory, where the various processors and/or memories of the connected devices provide for distributed information storage, control and logic processing.

In such a distributed (network) system having a number of nodes, a processor (e.g., of a device connected to a node) is connected or associated with each node. Each or some of those nodes are assigned a logical address, and each or some of the node processors run control logic that uses these logical addresses (of other nodes of the network). It may be desirable to have a centralized memory, e.g., of a centralized server in the network, for storing the mapping to physical addresses. However, the memory may also be distributed over the network nodes, where each or some of the nodes has, or is connectable to, its own node memory.

Software programs or applications, in particular the user-designed control logic, may be running on the processor(s), whether centralized or distributed. Furthermore, a combined approach can be used, with centralized network configuration and distributed network operation.

Furthermore, the devices may be interconnected to form a network of any configuration or topology, such as, for example, a star-topology, a hierarchical master-slave, a tree type, a multi-hop mesh or a flat bus-structure network, where each network node (or group of nodes) has a network address used by the processor 110 or other nodes to communicate with, e.g., to control or configure, the particular device (or group of devices) connected to the particular network node.

The centralized or distributed applications running on the processor(s), whether centralized or distributed, use logical and physical addresses as needed, using a mapping between the logical and physical addresses. For example, broadcast/multicast may be used as network communication with control/application layer using logical addresses. Alternatively, physical addresses (obtained from a table or map relating the logical addresses to physical addresses) maybe used in other cases, e.g., with unicast network communication. It should be noted that the network address of a physical device, referred to as the physical address, may be a purely numerical, and thus user unreadable, machine addresses, related to the node address or device's position in the network tree.

As shown in FIG. 1, a memory 130 is also operationally coupled to the processor 110 and stores various data and application logic for managing the network and/or controlling the various devices 120. Of course, in addition to or instead of the centralized memory 130, a distributed memory may be used to store information, where the distributed memory includes the various memories of the various devices 120. The memory 130 also stores a mapping of physical addresses of the devices/nodes to logical addresses. The logical addresses include the real or actual locations of devices, owners and/or device types in a user readable format, thus providing for user-friendly identifiers, such as the "light switch in the kitchen." Each device 120 has a logical address that includes at least two of the device type, owner, the actual device location, function and/or device features. Illustratively, the logical address includes the device type and the actual device location in the environment. Thus, more than one device of the same type may be uniquely identified and connected to the network; each device of the same type being distinguished based on its location, owner, function and/or device features, such as the "refrigerator in the kitchen" and the "refrigerator in the basement;" or "dad's switch" and "grandma's switch;" or "reading lamp" and "general lighting lamp;" or "wall-mounted switch" and "portable switch," and the like. Of course, devices may be grouped together and identified using a group logical address, for example.

Further, sensor(s) 140 may also be operationally coupled to the processor 110 for obtaining information on connected devices, especially to provide for the mapping between logical addresses and physical devices. Such connected device information may be automatically obtained upon device detection, or manually provided by the user. Of course, the user may also trigger update of the mapping and automatic collection or update of connected device information. For example, the sensors 140 may be configured to detect the device location in the network tree and/or in the real/actual location, and may include radio frequency identification (RFID) or bar code readers to read information from RFID tags or bar codes attached or associated with the devices 120 to determine the device type, device's physical address and/or device location in the network and/or in the real/actual location. Alternatively, any other detection methods as known or not yet known in the art may be used, e.g., using photosensitive devices (e.g., digital camera, light detectors), in-band ranging methods (e.g., time-of-flight measurement, RSSI measurement) or other detectors or sensor (e.g., ultrasound, IR).

It should be understood that in addition or instead of being connected to a central processor, the sensor(s) 140 may additionally or alternatively be connected to each network of the networked nodes. For example, RFID tags may be embedded in the environment identifying each network node, and an RFID reader included in the device(s) to be connected to the network reads the logical address of the particular network node from the RFID tag located near this particular network node. The RFID tag may be located near the node, such as in the walls or ceiling of a room near the network node location, or at particular preferred device location (e.g., in wall switch or power outlet cavity). In another embodiment, a central RFID reader connected to a central processor may read an RFID tag of a device that includes the device type and/or device's physical address, for example.

Of course information such as device type, device owner, device location and or device's physical address may also be manually provided by a user through any input/output (I/O) or user interface (UI) device 150 coupled to the processor, such as via a keyboard, mouse or other pointers for use with a screen, such as a touch sensitive screen which may include a map of the real/actual environments including device locations therein. User interfaces of the devices or other UIs that may be operationally connectable to the devices, e.g. keyboard (if available), pushbuttons, switches, dip switches etc., may also be used to configure the device with its logical address or part of it, the device type and/or location, for example.

The devices 120 may be any sensor, detector, controller and/or controllable device, such as appliances, switches and the like, including audio visual appliances, kitchen appliances, light or temperature control switches, dimmers, thermostats, garage door or other door openers, communication controls, smoke/fire detectors, motion sensors, surveillance cameras, ballasts, blinds, heating, cooling and ventilation devices, security monitoring and the like. The various devices and elements of the network or system 100 may be interconnected via any means, wired or wireless, through any protocol such as LON Works™, Bluetooth™, IEEE 802.15.4., ZigBee™, Wi-Fi™, and the like, for example.

Various control logic designs for networked control systems may be used, such as where the transport of control-related data may be simple and transparent to the application code itself, for example, as disclosed in European Patent Application Serial Number 07102125.7, entitled "Device for a Networked Control System," filed on Feb. 12, 2007, corresponding to PCT/IB2008/050445, which is incorporated herein by reference in its entirety. Illustratively, the control logic may be specified by the user on the collection of all devices in a target system, without the need to consider communication-related aspects, thus reducing the complexity of the control logic (as the user sees it) and the logic design process, and enabling a free allocation of control logic to devices. Then, as part of logic compilation, an executable runtime code is assigned to devices by a computer-controlled/automated process, optimizing the target control system with respect to device and/or network capabilities/resources. Subsequently, support logic, covering the distribution aspects, is automatically added, as necessary.

In an illustrative embodiment, the control logic may be designed, or the processor 110 may be configured or programmed, using virtual devices represented by logical addresses that include at least one identifier for the device type and at least one identifier for the location, for example. Thus, device functionality is defined in terms of logical addresses, rather than particular physical entities and/or physical addresses.

The logical address is a system-wide device address used in the control logic and for binding the physical network to the design; i.e. for setup and maintenance, for example. The logical address is independent of the underlying communication technology (to facilitate hybrid networks, for example, that include different devices and/or use different control or communication protocols). The logical address is also independent of the HW address of a particular device.

Logical addresses may include for example any one or combination of the following:

a user-friendly name, the device's type (e.g., "the switch", "the occupancy sensor"), location information (e.g., "upper left", "in room XY"), device's user/owner (e.g., "grandma's", "boss's"), device's intended function (e.g., "for reading", "night" or "primary", "secondary"), device's features (e.g., "built in", "portable", emitted light color, light temperature, light brightness, power consumption) and/or manufacturer, in textual form, the device's representation (which may be graphical such as an icon) in the design tool, e.g., having a screen for display and design a map or layout of the system. The system map or layout may be in tree format and/or the actual environment where the system is installed, such as building for example, or any combination thereof.

The system representation may be enhanced with numeric physical network addresses, associated with the actual/real logical addresses.

The processor 110 may be configured to process the logical addresses and map them to physical devices automatically by automatically extracting needed information such as device location and type, as detected and provided by the sensors/readers 140, for example, from meta-information of a device, and/or manually provided by the user from the I/O device 150. The physical addresses may be generated using a fully independent scheme. In addition or alternately, the physical addresses, especially the configurable network addresses, may partly represent the information in the logical address in form of reserved bits, for example, indicating device type and/or location, favorably providing for simplified/improved routing.

In addition to maintaining a mapping from the logical address to a physical address of a node connected to a network-connected device, the processor 110 may be further configured to control a network-connected device(s) in accordance with an assigned logical address and the corresponding application control logic. Illustratively, in the case the device is a switch in the entrance of a home or building, this switch may be configured for a certain role such as to be activated by the processor based on certain rules and turn on a light at night, for example. Illustratively, the switch may be configured by the user or by the processor based on rules such as 'illuminate entrances and exits (indoors and/or outdoors) of a building at night.' The mapping may be changeable at runtime, and the assigned logical address, together with the corresponding application control logic, is re-assignable either manually by the user or by the processor 110 in response to change in rules, replacement of devices, change in the sensor 140 readings, or other criteria.

In one illustrative embodiment, communication and control between devices 120 in the networked system 100 may be based on resolving logical addresses into routable physical addresses (e.g., HW address and/or network address).

Using available information, such as device type and location as detected by the sensor(s) 140, for example, or manually provided by the user, or automatically provided by the device itself, the processor 110 may be further configured to assign a logical address to a new device when the new device gets physically installed or when it gets configured, but before application logic installation. Instead of or in addition to performing the assignment by the central resolver/processor 110, the assignment may also be performed locally on every device via a local processor for example. The assigned logical address may be stored in a central program repository such as the memory 130 along with other data and applications for retrieval, as needed. Thus, a device may be able to retrieve the intended pre-programmed logical functionality from the memory or central program repository 130.

The processor 110 may also be configured to store in the memory 130 both the physical and logical addresses along with a cross-reference map therebetween. The network-connected devices, e.g., a particular device 120 may then contact this processor 110 or access the memory 130 to lookup the physical address that represents a given logical address for the particular device.

The network-connected devices 120 may also contact the processor 110 and/or the memory 130 when they get configured, e.g., in response to a request or command from the processor 110 which may be automatically generated upon detection of the device connection to the network. Upon connection to the network, a device 120 may be configured to communicate its physical address and available meta-information (such as device type and location) to the processor 110 and/or directly store such information or data in the memory 130. The processor 110 will then use this information to infer the devices' logical address and after doing so update the mapping of physical addresses to the logical addresses, and upload the logic to the new device. The processor may be configured to update the mapping once a physical network device belonging to a logical address changes, i.e., a logical address is re-instantiated by another physical node. In addition, or alternatively, the processor may be further configured to update the mapping once the logical address corresponding to a device changes.

Similarly, a device replacing another device resumes the operation of the replaced device. The processor 110 may be configured to detect that the new device replaced an existing device and provide the new device with a logical address which may be the same as the old device's logical address (e.g., when an old refrigerator in the kitchen is replaced and a new refrigerator, where the logical address remains the same, namely "refrigerator in the kitchen"), or an updated logical address that includes particular attributes or identifiers of the new device, keeping the same location information (if the old and new replacement device are at the same location). Thus, the new device will provide its type to the processor 110 or memory 130, and acquire the necessary application and support logic from the processor 110 for seamless integration in the network. Neither reprogramming nor changes to the application and support logic of other devices are required, thus providing for simple device integration into the network.

Figure 2:
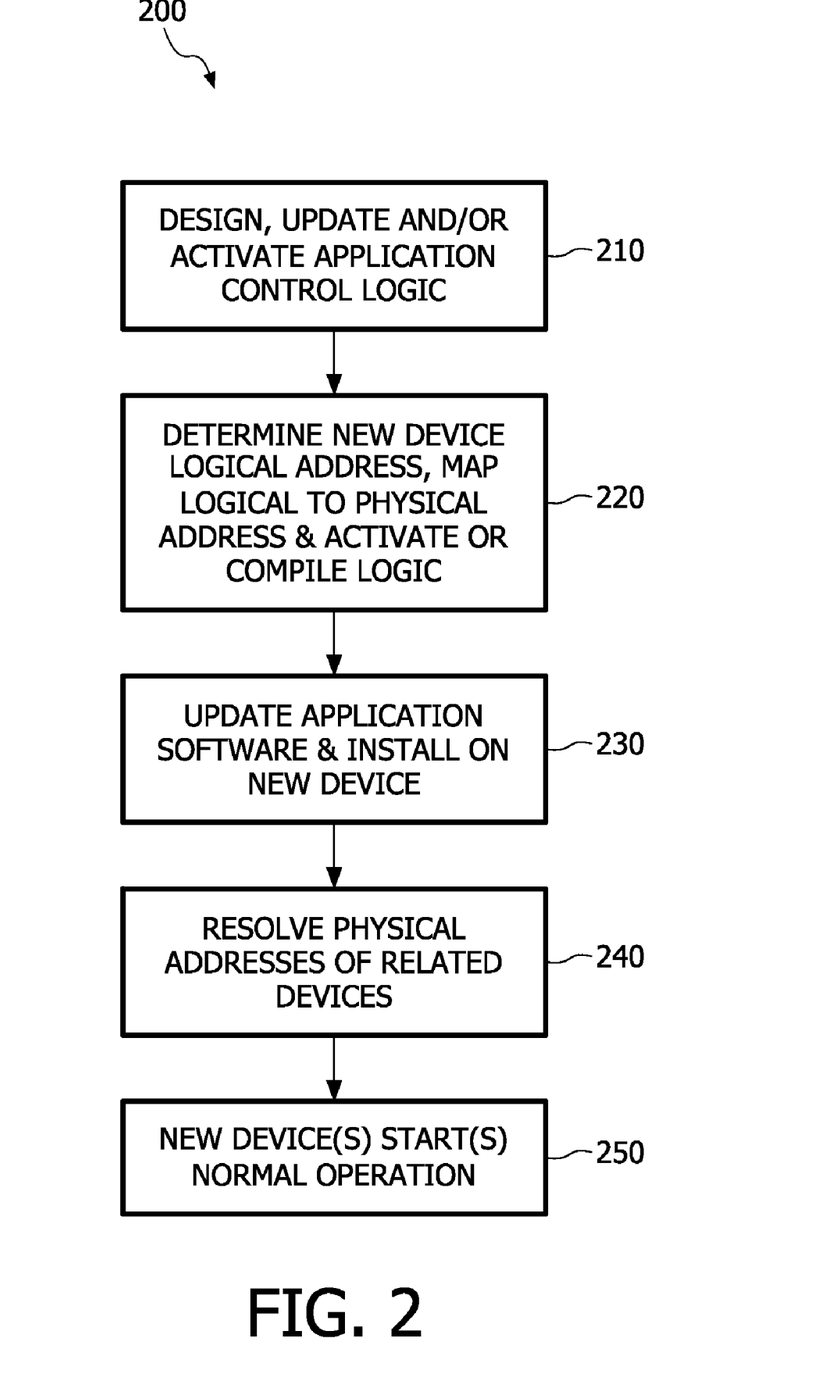
FIG. 2 shows a flow diagram in accordance with another embodiment of the present system.

FIG. 2 shows a flow diagram 200 in accordance with an embodiment of the present system for setting up a device in the control network or system 100, either as replacement of a device 120 already connected or part of the network, or as an addition of a new device to the network.

During act 210, the process begins which may include: design, update and/or activation of application control logic on processor 110, such as via user intervention and/or the processor 110 detecting a device 120 being added or connected to the network 100, e.g., hot plug & play, or an existing device being replaced, e.g., hot replacement.

Once a new device is installed, whether a new device is added (in which case the user may provide manual input of device location and/or type, for example, as described in connection with act 220), or a new device replaces an existing device in the network, then during act 220, mapping of the logical to physical address for the newly added device is determined and stored in the central program repository, such as the memory 130. The mapping of the logical to physical address may be performed automatically (e.g., if only one device is being added to the network) or may be performed via manual user input. Illustratively, for hot plug & play, the application control logic for the new device may already be defined and stored such as by the user or original system installer, but just lay "dormant" in the program repository. As soon as a physical address is coupled to the logical address, the "dormant" software becomes "active" and is instantiated. Thus, the application logic may already be available on the control program repository 130. Alternatively, at time of adding a new device, the user may define the new logical address for the newly added device, e.g., "table switch in living room." The user may further define and compile any needed application logic, as well as provide for the mapping.

Alternatively, the processor may automatically determine the new logical address for a particular physical device from metadata information provided by the newly added device (e.g. information of the device type and location of the node where the new device is connected), for example utilizing network-to-environment map stored in the memory 130. The data may be, for example, broadcast by the device upon connection to the network or provided (either by the device or by manually by a user of the system 100) in response to a request from the processor 110. The processor may send such a request, for example, upon detection (by the processor 110 or sensors 140 connected thereto) of a change in device connection or a change in device role, including upon manual user input, or simply upon reading or detecting a device role change, such as a device change or addition detected or read by the sensor 140, e.g., by reading an RFID tag or bar code associated with the newly added or changed device.

In yet another embodiment, the new device may be configured with its logical address, either manually by the user or via any in-band and/or out-of-band method(s). Upon connection to the network, the new device contacts the processor 110 and/or the central program repository stored in the memory 130 to sends its logical address together with its physical address for storage and update of the map.

The process next proceeds to act 230, where the processor 110 and/or the central program repository 130 updates the application software to reflect the changes caused by the newly replaced or added device. The processor 110 and/or the central program repository 130 prepares application software for the new device, including updating and compiling the application control logic for the new device and generating the support logic for the new device. Then, the application software is being installed on the new device. The support logic may include providing the new device with mapping of logical to physical addresses, for each device the new device has to communicate with. In the case of hot plug & play situation where a new device is added to the network (as opposed to replacing an existing device), the processor 110 and/or the central program repository automatically updates other devices of the network (for example, those sending data to or receiving data from or processing data for the new device) with new application software, including application control logic and/or support logic, related to the new device (if any).

In the next act 240, all devices with new/updated functionality, or functionality relating to the new/replaced device, resolve the physical addresses of the related devices by contacting the central resolver and/or processor 110. The mapping between physical and logical address may also be provided by the central resolver and/or processor 110 together with application software upload, as described in act 230.

Physical address resolution thus completes the process of adding or replacing a device to the system or network 100, where in act 250 the new device starts normal operation and the network 100 continues to operate under normal conditions, such as monitoring and controlling the connected devices to provide the user with access and control of the various devices connected to the various network nodes at various locations of the environment. Illustratively, the real or actual environment may be the user's home, office, building, retail space, etc. Thus, detectors, sensors 140 and/or controllable devices 120 may be easily configured and connected to the network 100 and may be interconnected for direct communication or communication through or under the control of the processor 110 to exchange data and effectuate environment monitoring and control, such as lighting control, temperature control, security monitoring, and the like.

In another embodiment, the mapping between the physical and the logical addresses may be resolved in a completely autonomous and/or distributed manner. Illustratively, the embedded distributed processors 110 of the networked devices 120 may resolve logical to physical addresses, by sending broadcast device announcements and/or broadcast resolve requests by the newly added or replaced devices, so that central processor 110 is not required once the logic is installed and it is not required to perform the resolver functionality. This holds for both hot plug & play and hot replacement.

In yet another embodiment, mapping of all devices' physical address to their logical addresses may be performed before application logic installation. The information on mapping of other devices' logical addresses to their physical addresses (if needed for the transport layers) may be installed together with the application logic.

In another embodiment, no resolution of logical addresses may be required (neither centralized nor distributed). In this case, routing may be done using broadcast or sending all communication through the central resolver 110, where logical addresses on the network layer may be used, for example. Such a simplified procedure may include the following acts where for hot plug & play situations only, on the central program repository, the user defines a new logical device address (e.g. "table switch in living room"), and the user also defines and compiles application logic. A new device to be connected to the network is configured with its logical address for mapping the physical address to the logical address. Next, the new device having a defined logical address connects to the network. Upon network connection, the new logical device establishes its logical functionality where, for example, the newly connected device contacts the central program repository, sending its logical address. In turn, the central program repository responds to the new logical device by sending the necessary application logic and application support logic. For hot plug & play only, the program repository updates automatically other devices with new logic related to the new device (if any), and the newly connected device starts normal operation.

No special precautions are needed for hot replacement, where certain system functionality may not be available in the system for a certain period of time until the system is reconfigured and updated to take into account the replaced device. Illustratively, any necessary updates are stored in the program repository and available to the central processor or, in the case of distributed processing, the updated data is available and/or provided to all the processors of the connected devices.

The processor 110 may be configured to map device physical address to its logical address from device type information and physical location of the device. The physical location of the device may be inferred from a mapping of node locations to actual location in the environment, and/or manually provided by the user, for example. The device type information may be broadcast by the device upon connection to the network, in response to a request or command from the processor, and/or be read by the sensor 140 (e.g., RFID or bar code reader) and provided to the processor. As described, an RFID reader operationally coupled to the processor may the RFID tag of a device that include device information, such as type, specification, manufacturer, etc., where the location of the device may be manually provided by the user/installer, which may be in response to a request from the processor, e.g., upon detection of a newly connected or replaced device.

Alternatively, or in addition, each device may have an RFID reader that reads an RFID tag embedded in the environment, such as a wall or ceiling of a room. The RFID tag provides location information, such as "hallway of the first floor" or "kitchen," for example. Next, the device information (e.g., type, etc.) along with the device location is stored in the a central program repository, device memory or any other centralized or distributed memory accessible by the processor, which may be centralized, or the processors of the various network connected devices in the case of distributed processing.

Mapping of the device's physical address to its logical address may be performed, for example, in a commissioning phase, over in-band commands, manually (e.g., DIP switches) on device programming/installation; and/or via RFID tags or barcodes, preprogrammed with logical address and attached to the (planned or predetermined) location of the device. In this case, appropriate sensors 140 may be provided with appropriate reader interfaces, such as to read the RFID tags or barcodes associated with the new device connected or to be connected to the network 100.

The present system and methods may be used for control systems of lighting, security and the like. Various sensors and rules may be included, such as occupancy, motion and daylight sensors along with pre-defined rules, e.g., for weekdays and weekends, for normal business hours and off-hours or after-work hours, thus providing for control associated with predetermined rules. Other control systems that may include the present system and methods may be building automation systems; home control systems; atmosphere lighting systems; including other control and automation environments, such as industrial, retail, institutional, residential, and the like.

Of course, as it would be apparent to one skilled in the art of communication in view of the present description, various elements may be included in the system or network components for communication, such as transmitters, receivers, or transceivers, antennas, modulators, demodulators, converters, duplexers, filters, multiplexers etc. The communication or links among the various system components may be by any means, such as wired or wireless for example. The system elements may be separate or integrated together, such as with the processor. As is well-known, the processor executes instruction stored in the memory, for example, which may also store other data, such as predetermined or programmable settings related to system control.

It should be understood that the various component of the interaction system may be operationally coupled to each other by any type of link, including wired or wireless link(s), for example. Various modifications may also be provided as recognized by those skilled in the art in view of the description herein. The memory may be any type of device for storing application data as well as other data. The application data and other data are received by the controller or processor for configuring it to perform operation acts in accordance with the present systems and methods.

The operation acts of the present methods are particularly suited to be carried out by a computer software program, such computer software program preferably containing modules corresponding to the individual steps or acts of the methods. Such software can of course be embodied in a computer-readable medium, such as an integrated chip, a peripheral device or memory, such as the memory or other memory coupled to the processor of the controller or light module.

The computer-readable medium and/or memory may be any recordable medium (e.g., RAM, ROM, removable memory, CD-ROM, hard drives, DVD, floppy disks or memory cards) or may be a transmission medium (e.g., a network comprising fiber-optics, the world-wide web, cables, and/or a wireless channel using, for example, time-division multiple access, code-division multiple access, or other wireless communication systems). Any medium known or developed that can store information suitable for use with a computer system may be used as the computer-readable medium and/or memory.

Additional memories may also be used. The computer-readable medium, the memory, and/or any other memories may be long-term, short-term, or a combination of long-and-short term memories. These memories configure the processor/controller to implement the methods, operational acts, and functions disclosed herein. The memories may be distributed or local and the processor, where additional processors may be provided, may be distributed or singular. The memories may be implemented as electrical, magnetic or optical memory, or any combination of these or other types of storage devices. Moreover, the term "memory" should be construed broadly enough to encompass any information able to be read from or written to an address in the addressable space accessed by a processor. With this definition, information on a network, such as the Internet, is still within memory, for instance, because the processor may retrieve the information from the network.

The processors and the memories may be any type of processor/controller and memory. The processor may be capable of performing the various described operations and executing instructions stored in the memory. The processor may be an application-specific or general-use integrated circuit(s). Further, the processor may be a dedicated processor for performing in accordance with the present system or may be a general-purpose processor wherein only one of many functions operates for performing in accordance with the present system. The processor may operate utilizing a program portion, multiple program segments, or may be a hardware device utilizing a dedicated or multi-purpose integrated circuit. Each of the above systems utilized for identifying the presence and identity of the user may be utilized in conjunction with further systems.

Of course, it is to be appreciated that any one of the above embodiments or processes may be combined with one or with one or more other embodiments or processes to provide even further improvements in finding and matching users with particular personalities, and providing relevant recommendations.

Finally, the above-discussion is intended to be merely illustrative of the present system and should not be construed as limiting the appended claims to any particular embodiment or group of embodiments. Thus, while the present system has been described in particular detail with reference to specific exemplary embodiments thereof, it should also be appreciated that numerous modifications and alternative embodiments may be devised by those having ordinary skill in the art without departing from the broader and intended spirit and scope of the present system as set forth in the claims that follow. The specification and drawings are accordingly to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same or different item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

We claim:

1. A networked control system comprising:

a plurality of devices connected to a network, at least one device of the plurality of devices having a human readable logical address that includes at least two selected from the group consisting of a device type, a device location in an environment, a device owner, an intended device function, a device feature and a device manufacturer of the at least one device; and a processor configured to:

execute control logic using the logical address;

maintain a mapping from the logical address to a physical address of the at least one device;

update the mapping once the logical address corresponding to the at least one device changes; and control the at least one device in accordance with an assigned logical address and the corresponding control logic, wherein the mapping is changeable at runtime, and the assigned logical address together with the corresponding control logic is re-assignable.

2. A method for forming a network having a plurality of devices connected to the network, the method comprising the steps of:

defining a human readable logical address of at least one device of the plurality of devices, the logical address including at least two selected from a group consisting of a device type, a device location in an environment, a device owner, an intended device function, a device feature and a device manufacturer of the at least one device;

designing, installing and executing control logic using the logical address;

maintaining a mapping from the logical address to a physical address of the at least one device; and controlling the at least one device in accordance with an assigned role, wherein the mapping is changeable at runtime, and the assigned role is re-assignable.

* * * * *